(No Model.) 4 Sheets—Sheet 1.

F. W. DEAN & W. E. MATHEWS.
SNOW PLOW FOR STREET RAILWAYS.

No. 527,523. Patented Oct. 16, 1894.

Witnesses:
Walter E. Lombard
H. Theodore Fletcher

Inventors:
Francis W. Dean,
William E. Mathews;
by N. C. Lombard
Attorney.

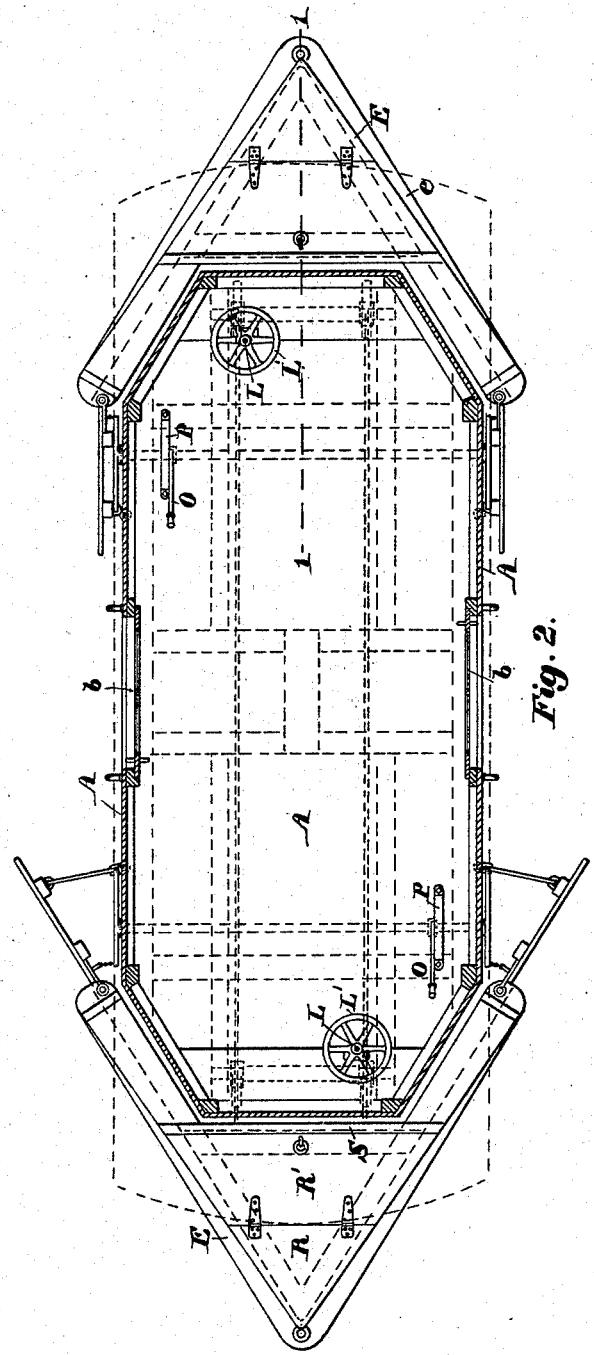

(No Model.) 4 Sheets—Sheet 3.

F. W. DEAN & W. E. MATHEWS.
SNOW PLOW FOR STREET RAILWAYS.

No. 527,523. Patented Oct. 16, 1894.

Witnesses:
Walter E. Lombard
H. Theodore Fletcher

Inventors:
Francis W. Dean,
William E. Mathews;
by N. C. Lombard
Attorney.

(No Model.) 4 Sheets—Sheet 4.

F. W. DEAN & W. E. MATHEWS.
SNOW PLOW FOR STREET RAILWAYS.

No. 527,523. Patented Oct. 16, 1894.

Witnesses:
Walter E. Lombard.
H. Theodore Fletcher.

Inventors:
Francis W. Dean,
William E. Mathews,
by N. C. Lombard
Attorney.

UNITED STATES PATENT OFFICE.

FRANCIS W. DEAN, OF CAMBRIDGE, AND WILLIAM E. MATHEWS, OF BOSTON, ASSIGNORS TO THE TAUNTON LOCOMOTIVE MANUFACTURING COMPANY, OF TAUNTON, MASSACHUSETTS.

SNOW-PLOW FOR STREET-RAILWAYS.

SPECIFICATION forming part of Letters Patent No. 527,523, dated October 16, 1894.

Application filed July 25, 1894. Serial No. 518,586. (No model.)

*To all whom it may concern:*

Be it known that we, FRANCIS W. DEAN, of Cambridge, in the county of Middlesex and State of Massachusetts, and WILLIAM E. MATHEWS, of Boston, in the county of Suffolk and State aforesaid, have invented jointly certain new and useful Improvements in Snow-Plows for Street-Railways, of which the following, taken in connection with the accompanying drawings, is a specification.

Our invention relates to snow plows for street railways, and it consists in certain novel features of construction, arrangement and combination of parts which will be readily understood by reference to the description of the accompanying drawings and to the claims hereto appended and in which our invention is clearly pointed out.

Figure 1:
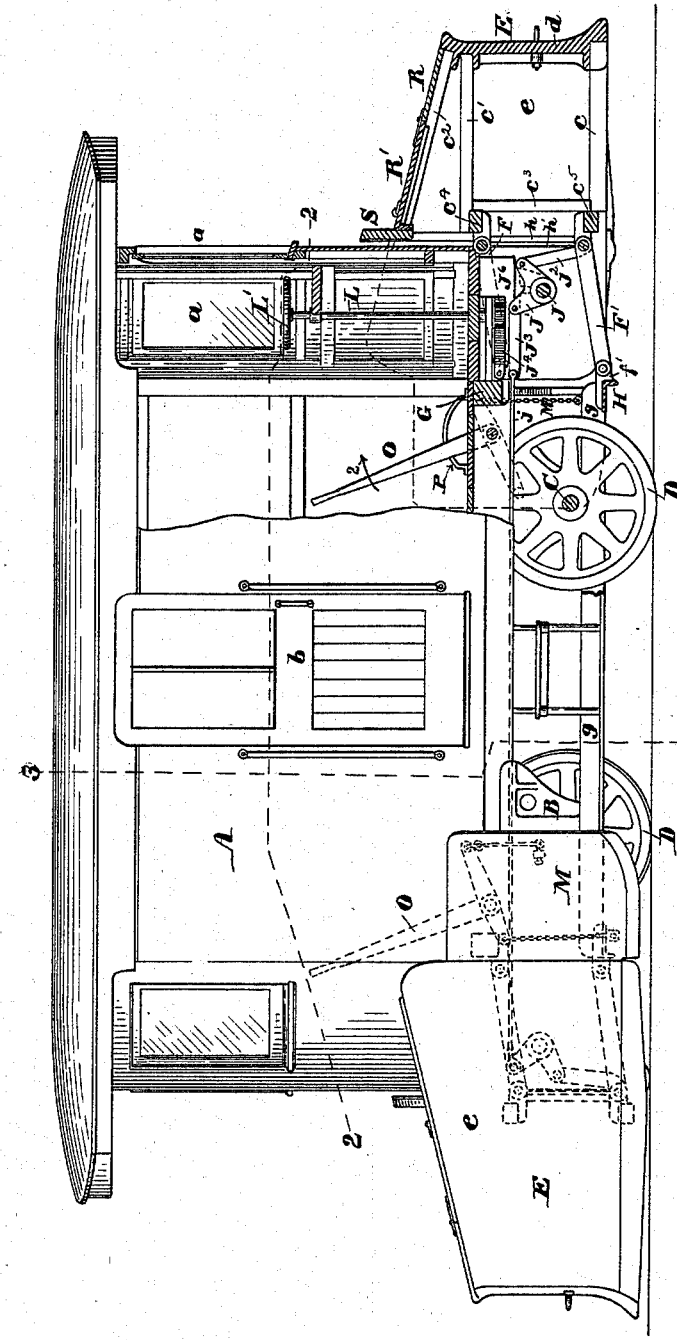
Figure 4:
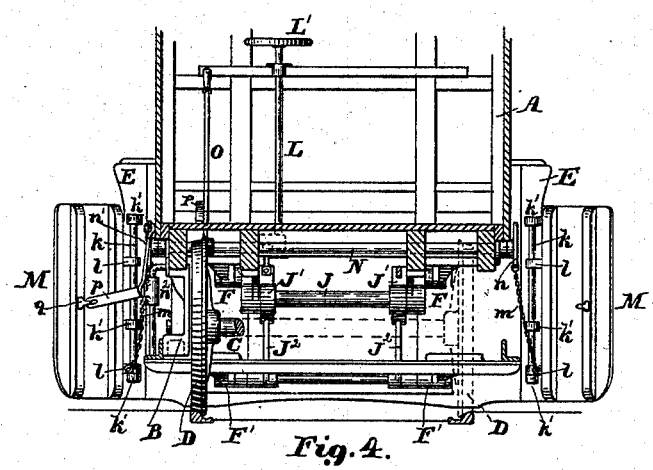
Figure 3:
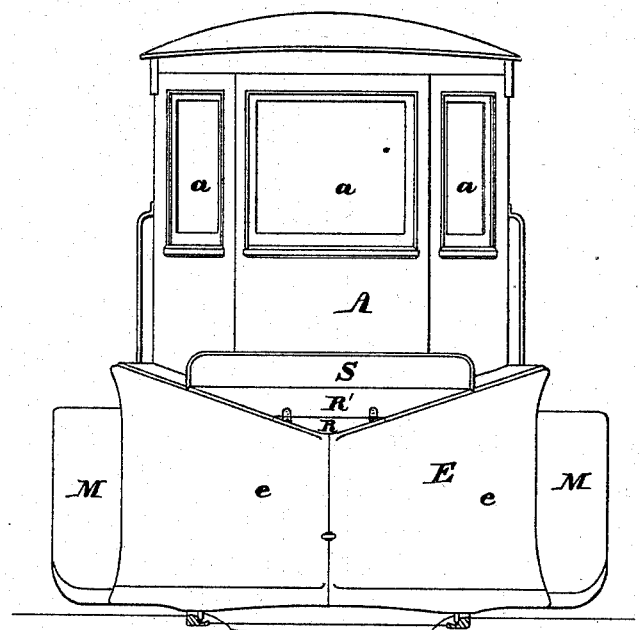
Figures 5, 6:
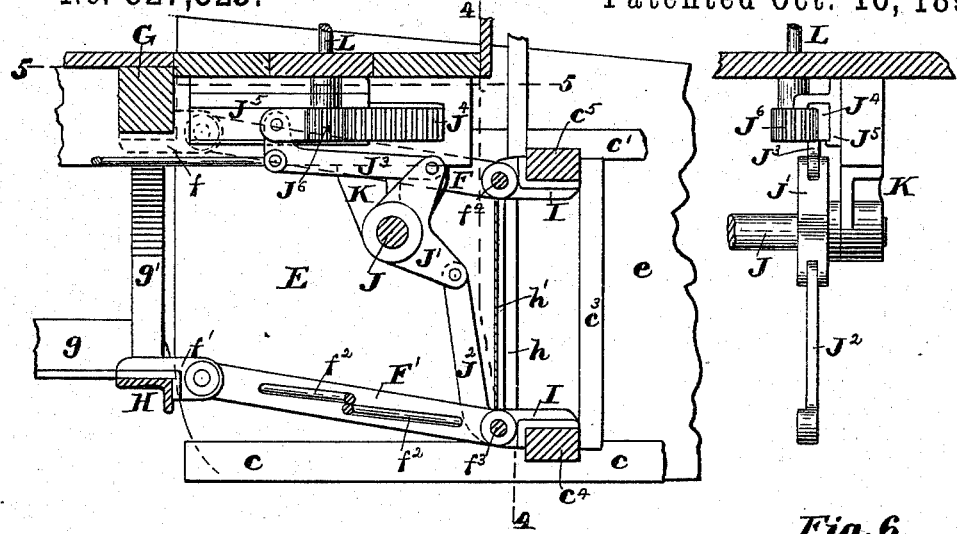
Figures 7, 8:
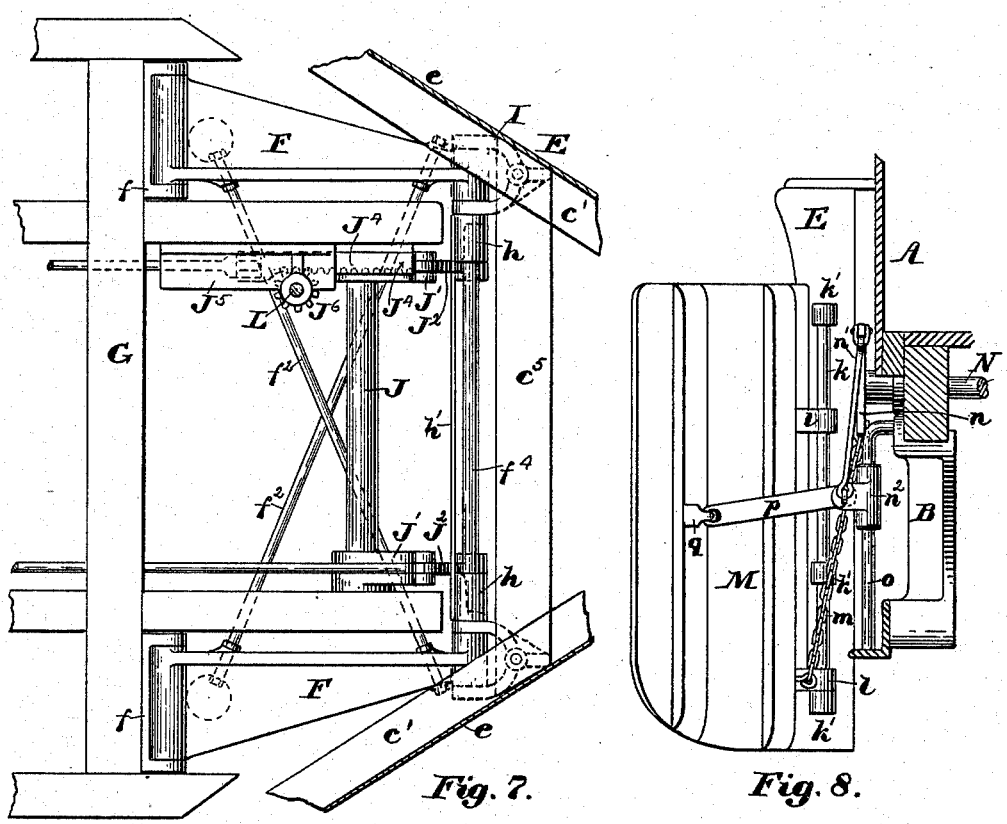

Figure 1 of the drawings is a side elevation of a snow plow embodying our invention with a portion at one end shown in section the cutting plane being on line 1, 1, on Fig. 2. Fig. 2 is a sectional plan the cutting plane being on line 2, 2, on Fig. 1. Fig. 3 is an end elevation. Fig. 4 is a partial vertical transverse section on line 3, 3, on Fig. 1 looking toward the left of said figure. Fig. 5 is a partial vertical longitudinal section through the floor of the car and showing in elevation a portion of the inside of one side of the plow in working position and the mechanism for raising and lowering the same. Fig. 6, is a partial vertical transverse section on line 4, 4, on Fig. 5 and showing portions of the mechanism for raising and lowering the plow, in elevation. Fig. 7, is a horizontal section through a small portion of the two oblique sides of one of the plows and showing the mechanism for raising and lowering said plow and portions of the sills of the car body in plan, the cutting plane being on line 5, 5, on Fig. 5, and Fig. 8, is a partial vertical section on line 3, 3, Fig. 1 looking toward the forward end of the plow. Figs. 5, 6, 7 and 8 are drawn to an enlarged scale.

In the drawings A is the car body provided with suitable windows $a\ a$ at each end and a door $b$ in the center of each side, and having secured to its sills suitable housings B, in bearings in which are mounted the axles C, C, having secured thereon the wheels D, D, as shown.

E E are two V shaped plows each composed of a suitable skeleton frame of wooden timbers $c\ c'\ c^2\ c^3\ c^4$ and $c^5$ and metal upright $d$ and steel or wrought iron plates $e$ arranged in a vertical or nearly vertical position but diverging from the point of the V toward the right and left, as they extend toward the center of the car body, and inclose the lower portions of the semi octagonal ends of said car body, as shown in Fig. 2.

Each plow is pivoted to the movable ends of two pairs of links F and F' of equal lengths and arranged parallel to each other, the link F being pivoted to fixed stands $f$ secured to the car sill G, and the link F' being pivoted to similar stands $f'$ secured to the cross-tie H suspended below the car body by connection with the side bars $g$, and the transverse tie braces $g'$. The movable ends of the two pairs of parallel links F and F' at each end of the car body are connected together by two vertical links $h$ pivoted thereto and connected together by the metal plate $h'$ firmly riveted thereto as shown in Figs. 1, 5, and 7, and the lower links F' F' are also connected by the diagonal braces $f^2, f^2$, as shown in Figs. 5 and 7.

The pivots connecting the movable ends of the links F and F' to the plows are preferably shafts, as $f^3$ and $f^4$ each of which extends through and connects two of said levers and the two stands I, I, secured upon the cross beams $c^4$ or $c^5$ of the plow E as shown in Figs. 5 and 7.

J J are two shafts mounted in horizontal positions in bearings in the stands K K secured to the body of the car, one pair of stands at each end thereof. Each shaft J has firmly secured thereon two elbow levers J' one arm of each of which is connected by the link J² to the shaft $f^3$, and the other arm of one of said levers has pivoted thereto one end of the link J³ the opposite end of which has a short upwardly projecting arm which is pivoted to the toothed rack J⁴ which is fitted to, and movable endwise in, a suitable guideway in the stand J⁵ secured to the frame work of the car body, said rack being engaged by the pinion $J^6$ mounted upon the lower end of the vertical shaft L mounted in suitable bearings and having secured upon its upper end the hand wheel L' by which said shaft and pinion may be revolved, in either direction, to raise or lower the movable ends of the links F and F' and the snow plow pivoted thereto, all as shown in Figs. 1, 5 and 7.

The link $J^3$ also has pivoted thereto one end of the connecting rod $j$ the opposite end of which is pivoted to the upper arm of one of the levers J' on the shaft J at the other end of the car.

The shaft L, hand wheel L', pinion $J^6$, rack $J^4$, and link $J^3$ are duplicated at the opposite end of the car and the toothed rack at each end of the car is connected as above described to an elbow lever on each of the shafts J so that the plows may be raised or lowered by operating either of the hand wheels L', and the snow plows are so hung that they will balance each other and when the plow at one end is in its lowermost position in contact or nearly so with the rails the other plow will be raised about ten inches above the rails, and both plows will at all times maintain a horizontal position, that is the heel of the plow will always be at substantially the same distance from the rail as the point of the plow.

M M are supplementary wings hinged to the inner or rear ends of the flaring sides of the snow plows so that they can be swung around their hinge pivots into positions parallel to the sides of the car as shown at the right of Fig. 2 or oblique thereto so as to form extensions of the oblique sides of the plow as shown at the left of said Fig. 2.

The wings M are hinged upon the vertical rods $k$ $k$ in such a manner that they may be moved vertically thereon to raise or lower said wings, said rods $k, k,$ being permanently attached to the plows in fixed positions by being set in suitable bearings $k'$ $k'$ at each end while the positions of the hinges $l$ $l$ attached to the wings are free to be moved up and down thereon between said bearings.

Each wing M has secured to its inner surface, near its hinged edge and lower end, an eye bolt to which is attached one end of the chain $m$ the other end of which is connected to the movable end of the short arm of the lever $n$ secured upon the shaft N mounted in suitable bearings on the car body, and the other end of said lever $n$ has connected thereto by a sort of universal joint the upper end of the link $n'$ the lower end of which is in like manner connected to the sleeve $n^2$ mounted upon the fixed vertical rod $o$ in such a manner that it may be moved up and down thereon, and at the same time be moved about the axis of said rod. The sleeve $n^2$ also has connected thereto one end of a link $p$ the opposite end of which is connected to an eye-bolt $q$ set in or secured to the inner side of the wing M near its rear end, the connections of said link $p$ to said sleeve $n^2$ and to the eye bolt $q$ being such that said link may be moved vertically and laterally relative to the vertical plane of the said wing.

The shaft N has firmly secured thereon the hand lever O by which said shaft may be moved about its axis to raise the wing M independently of the raising and lowering of the plow proper.

When the plow proper and the wings M connected thereto are in their lowermost position as shown at the left of Fig. 1 and it is desired to raise the plow the hand wheel L' at either end of the car is operated to move the rack $J^4$ in the desired direction to raise the depressed plow and depress the elevated plow.

The raising of the depressed plow raises the wings attached thereto, without operating the lever O, by the lower bearings $k'$ of the rods $k$ coming in contact with the lower hinge sections $l$ on said wings, but the plow at the other end of the car is depressed without affecting the position of the wings M attached thereto which are shown as raised and swung into position parallel to the sides of the car body, in which position they may remain while the plow is operated moving in the direction to the right of Fig. 1 if it is only desired to clear the snow away to a width only a little greater than the width of the track. If however it is desired to clear a wider path, the wings M attached to the plow shown at the left of Fig. 1 which has been depressed, are depressed by moving the hand lever O at that end of the car in the direction indicated by the arrow 2, on Fig. 1. This movement of said lever causes a partial rotation of the shaft N in the same direction causing the movable end of the short arms of the levers $n$ $n$ to descend, thus allowing the force of gravity to cause the descent of said wings to their lowermost position and at the same time the upward movement of the longer arms of said levers $n, n,$ acting upon the links $n'$ moves the sleeves $n^2$ $n^2$ upward on the rods $o, o,$ carrying therewith the inner ends of the links $p$ and causing said links to assume horizontal or nearly horizontal positions, and in doing so to move the rear ends of said wings outward into positions substantially in line with the oblique sides of the plow.

When the plow is depressed as at the left of Fig. 1, and the wings M attached thereto are in their lowest and expanded positions, and it is desired to discontinue their use for the time being it is only necessary to move the hand lever O connected therewith toward the center of the car when the reverse action to that described above takes place and the wings are raised and folded against the sides of the car body, as shown at the right of Fig. 2.

The hand levers O are made to spring laterally and arranged to press against the edges of the segmental stands P which have formed therein a plurality of notches, not shown, with which said levers engage to lock said lever so as to hold said wings in their raised positions whether in their highest or intermediate raised positions.

By the construction and arrangement of the parts, as hereinbefore described, the plow car may be run either end foremost with the plow that is in advance in working position, while the other plow is elevated, and the wings M may be expanded to a greater or less distance from the side of the car or folded against the side thereof as may be desired.

The two plows are so hung that they balance each other, so that it requires the exertion of but a small amount of power to change their positions as when one plow is being raised the other is being depressed and "vice versa" and at the same time said plows are maintained at all times substantially parallel to the rails of the track upon which the car is being operated.

This snow plow is adapted for use on street railways and may be operated by electricity or by a cable, but as the means of propulsion forms no part of our invention we have not shown or described any mechanism for propelling the same.

The car will also be provided with suitable brakes and brake operating mechanism but as various forms of brake operating mechanism may be used and as we lay no claim to such mechanism we have omitted the brakes and brake mechanism from the drawings in order to the more clearly show the features of our invention.

The portions of the plows which project forward of or beyond the ends of the car body are covered in by a roof R in which is formed a trap door R' through which access may be had to the mechanism by which said plows are suspended and operated, for adjusting or repairing the same.

S is a guard board projecting above said roof just in front of the end of the car body to prevent the snow sifting in between the car body and the snow plow.

What we claim as new, and desire to secure by Letters Patent of the United States, is—

1. In combination with a car or vehicle fitted to, and adapted to be propelled upon, the tracks of a street railway, a V shaped plow constructed and arranged to partially inclose the lower portion of one end of the vehicle body and connected to said vehicle body by a system of parallel motion links; and means having provision for raising and lowering said plow from the vehicle platform, without changing the substantial parallelism of said plow relative to the railway track.

2. In combination with a car or vehicle fitted to and adapted to be propelled upon the tracks of a street railway, a pair of V shaped plows arranged one at each end of said vehicle with their points in opposite directions; a system of parallel motion links connecting each of said plows to said vehicle body; mechanisms arranged at or near each end of the body of said vehicle and each having provision for raising and lowering one of said plows; connections between said hoisting mechanisms whereby said plows are made to balance each other, and either plow may be raised and the other lowered by operating the hoisting mechanism at either end of the vehicle.

3. The combination with a car or vehicle fitted to, and movable on a street railway track, of the plow E; the links F and F' fulcrumed on the vehicle body and pivoted to the plow as set forth; the rocker shaft J; the elbow levers J' J' the links $J^2$ and $J^3$; the rack $J^4$; the pinion $J^6$; the shaft L and hand wheel L' all constructed arranged and operating substantially as described.

4. In combination with a car or vehicle fitted to and movable on a street railway track; a pair of V shaped plows E arranged one at each end of said vehicle body with their points facing in opposite directions; two sets or systems of parallel motion links F F' fulcrumed upon opposite ends of said vehicle body and each set pivoted to one of said plows; two shafts J, J; two elbow levers J' J' mounted on each of said shafts; two pairs of links $J^2$ connecting said elbow levers to said plows; two racks $J^4$ mounted in suitable guideways at opposite ends of the vehicle body; the pinions $J^6$ engaging said racks; the shafts L L; the hands wheels L' L'; the links $J^3$ connecting said racks to one of the elbow levers on each of the shafts J; and the two connnecting rods j, each connecting one of the links $J^3$ to one of the elbow levers J' on the shaft J at the opposite end of the vehicle body.

5. In combination with a car or vehicle fitted to and movable on a street railway track, a V shaped plow connected to said vehicle by a system of parallel motion levers; and a pair of supplemental wings pivoted to the rear end of said plow, one at each side of the vehicle body; and means having provision for raising and lowering said wings and moving them about their pivotal connection to said plow, independently of the rise and fall of said plow.

6. The combination of a car or vehicle fitted to and movable upon a street railway track; a V shaped plow in front of and partially inclosing the end of said vehicle; a system of parallel motion levers fulcrumed upon said vehicle body and pivoted to said plow; the rods k, k, mounted in fixed bearings on said plow one on each side of the vehicle body; the two supplementary wings M M hinged to said rods so as to be movable vertically thereon; the rods o, o, attached in fixed positions to said vehicle one on each side; the two sleeves $n^2$ $n^2$ fitted to and movable vertically on said rods; the links p, p, connecting said sleeves to said wings; the rocker shaft N; the hand lever O and the two two-armed levers n, n, firmly secured on said shaft; the chains m, m, connecting one arm of said levers n, n, to said wings M; and the links n'

$n'$ connecting the other ends of said levers $n$, $n$, to said sleeves $n^2$, $n^2$, substantially as described.

7. In combination with a car or vehicle fitted to and movable upon a street railway track; two V shaped plows adjustably connected one to each end of said vehicle and movable vertically relative thereto; a system of levers, links or rods connecting said plows together whereby said plows are made to balance each other and maintain a substantial parallelism with the railway track in all positions to which they may be adjusted; and means having provision for raising one plow while the other is being depressed.

In testimony whereof we have signed our names to this specification, in the presence of two subscribing witnesses, on this 17th day of July, A. D. 1894.

FRANCIS W. DEAN.
    WILLIAM E. MATHEWS.

Witnesses:
 N. C. LOMBARD,
 H. THEODORE FLETCHER.